United States Patent [19]

Webb

[11] 4,145,190

[45] * Mar. 20, 1979

[54] CATALYTIC FUEL ADDITIVE FOR JET, GASOLINE, DIESEL, AND BUNKER FUELS

[75] Inventor: Harry M. Webb, Toronto, Canada

[73] Assignee: Natural Resources Guardianship International, Inc., Clayville, N.Y.

[*] Notice: The portion of the term of this patent subsequent to Jul. 11, 1995, has been disclaimed.

[21] Appl. No.: 841,905

[22] Filed: Oct. 13, 1977

Related U.S. Application Data

[63] Continuation-in-part of Ser. No. 809,864, Jun. 24, 1977, and a continuation-in-part of Ser. No. 783,777, Apr. 1, 1977.

[51] Int. Cl.² .............................................. C10L 1/22
[52] U.S. Cl. ............................................ 44/56; 44/57
[58] Field of Search ........................ 44/56, 57, 58, 51

[56] References Cited

U.S. PATENT DOCUMENTS

| | | | |
|---|---|---|---|
| 1,677,273 | 7/1928 | Costaguta | 44/56 |
| 1,820,983 | 9/1931 | Loomis | 44/72 |
| 3,282,858 | 11/1966 | Simmon et al. | 44/57 |

FOREIGN PATENT DOCUMENTS

491648  9/1938  United Kingdom ........................ 44/57

*Primary Examiner*—Winston A. Douglas
*Assistant Examiner*—Y. Harris-Smith
*Attorney, Agent, or Firm*—John S. Roberts, Jr.

[57] ABSTRACT

An energy-saving fuel additive for jet engines, gasoline and diesel engines, including additions to domestic heating and light industrial oils (#2 and #3) and residual or bunker fuel (#4, 5, and 6), which comprises as active ingredients a catalytic mixture of a major proportion of picric acid and a minor proportion of ferrous sulfate.

17 Claims, No Drawings

CATALYTIC FUEL ADDITIVE FOR JET, GASOLINE, DIESEL, AND BUNKER FUELS

This application is a continuation-in-part application of pending U.S. Ser. No. 783,777 filed Apr. 1, 1977, by Harry M. Webb, and pending U.S. Ser. No. 809,864 filed June 24, 1977, by Harry M. Webb.

The present invention relates to an energy-saving fuel additive for jet, gasoline, and diesel engines, including the use as an additive for domestic heating and light industrial oils (#2 and #3) and bunker or residual fuels (#4, 5, and 6) which comprises as active ingredients a catalytic mixture of a major proportion of picric acid and a minor proportion of ferrous sulfate. These general designations or gradations of fuel oils are as accepted by the American Society of Testing Materials, Philadelphia, Pa., and cited in *Encyclopedia of Chemical Technology* II, Volume 15, page 81 (1968, Wiley-Interscience).

A preferred solvent suitable for use is a combination of an alkyl benzene, such as toluene, and a lower alcohol, such as isopropanol. Operable substitutes for isopropyl alcohol, although not preferred, are ethanol and methanol together with water and the two may be used in a composite relationship. The combination specially may include a minor amount of nitrobenzene as well as a particulate reducer such as a long chain tertiary amine (Primene 81R).

The additive mix or concentrate denotes MSX Mix useful for bulk addition is as follows for one gallon:

|  | U.S. Gallon | | Imperial Gallon | |
| --- | --- | --- | --- | --- |
|  | Preferred | Range | Preferred | Range |
| Ferrous sulfate | 1.4 g | .08 – 1.4 g | 1.7 g | 0.1 – 1.7 g |
| Picric acid (trinitrophenol) | 45.0 g | 2.8 – 45.0 g | 54.0 g | 3.5 – 54.0 g |
| Toluene | 2.4 kg | 2.4 – 1.0 kg | 2.9 kg | 2.9 – 1.2 kg |
| Isopropyl alcohol | 1.0 kg | 1.0 –2.4 kg | 1.2 kg | 1.2 – 2.9 kg |
| Nitrobenzene | 2.7 g | .08 – 2.7 g | 3.2 g | 0.1 – 3.2 g |
| Long chain amine; e.g., tertiary dodecylamine | 1.7 g | .2 – 1.7 g | 2.0 g | .24 – 2.0 g |
| Water | Balance | Balance | Balance | Balance |

In the solvent the preferred relationship of toluene and isopropyl alcohol is about 2:1 by weight.

Additionally, where heavy oils are involved as with bunker and residual fuels (#4, 5, and 6) the following formulation is utilized per gallon:

|  | U.S. Gallon | | Imperial Gallon | |
| --- | --- | --- | --- | --- |
|  | Preferred | Range | Preferred | Range |
| Ferrous sulfate | 4 g | 4–5.6 g | 5 g | 5–7 g |
| Picric acid (trinitrophenol) | 8 g | 8–12 g | 10 g | 10–15 g |
| Toluene | 4 kg | 4–5.6 kg | 5 kg | 5–7 kg |
| Isopropanol | .8 kg | .8–1.2 kg | 1 kg | 1–1.5 kg |
| Long chain amine; e.g., tertiary dodecylamine | .2 g | .2–1.7 g | .24 g | .24–2.0 g |
| Water | Balance | Balance | Balance | Balance |

The MSX Mix is utilized for dosage to fuels in the ratio of 1:1,000 to 1:2,000 with a preferred dosage of 1:1600 parts by volume.

In the aforesaid formula which is set out for U.S. and Canadian use, it is noted that the preferred range in the MSX Mix is at or near the highest range given, which gives a more active composition. In addition, where nitrobenzene is utilized the top values of the range are near the delimiting value presently set out by Energy Research and Development Administration for NOx emissions. A catalytic action occurs in the binary active ingredient due to the presence of the metallic ion $Fe^{++}$ in the composition, causing the slightly heavier and less volatile ends to burn completely, thus increasing the energy and decreasing the emissions of raw hydrocarbons from the exhaust.

The prior art statement for the present invention is set out below.

Relating to Picric Acid

U.S. Pat. No. 928,803 Selden teaches at column 1 use of picrates of fused ring compounds such as naphthalene in a solvent selected from alcohols, benzene, and acetone.

U.S. Pat. No. 3,294,501 Kawahara notes the use of picric acid at column 1 as a lead appreciator.

U.S. Pat. No. 3,434,814 Dubeck speaks of the reduction of hydrocarbon emission from internal combustion engines by operating the gasoline containing ortho-substituted aromatic nitro compounds and prefers picryl acetate.

Art Bearing on Ferrous Sulfate

U.S. Pat. No. 3,002,826 Norris as an additive incorporates preferably aluminum sulfate and other salts, both inorganic and organic, to reduce vanadium deposition which causes corrosion and deposits.

U.S. Pat. No. 3,348,932 Kukin at column 2 states that a small percentage of iron salts may be used as part of a salt combination as a combustion aid in domestic furnaces, diesel equipment, jet engines, etc., to force combustion of the fuel to final products, such as carbon dioxide and water.

Art Pertaining to the Solvent

U.S. Pat. No. 914,624 Winand, at page 1, column 2, mentions the use of nitrobenzene as "an oxygen-bearer."

U.S. Pat. No. 1,423,050 Tunison, at column 2, line 103, mentions nitrobenzol or nitrobenzene as an explosion promoter for internal combustion engines and diesel engines.

U.S. Pat. No. 4,002,435 Wenzel illustrates a water-in-oil emulsion of hydrocarbons, water, and an alcohol suitable for injection methods as noted in column 2.

The energy-saving compositions and method of treating fuels set out in the present invention differ from the above-cited prior art. Primarily this invention lies in a novel mixture of active ingredients; namely, picric acid (2,4,6-trinitrophenol) and ferrous sulfate $FeSO_4$). These constitute the active ingredients of the present composition utilizing picric acid in the majority amount. In a preferred bulk composition, the amount of picric acid in a U.S. gallon ranges from 2.8–45.36 grams and the ferrous sulfate 0.08–1.36 grams. Thus, as has been stated as to the thrust of use, the picric acid provides the major oxidizing component of the composition and the ferrous iron in the ferrous sulfate provides the catalytic action. Nitrobenzene is used primarily as a solvent and has a secondary use as an auxiliary oxidant. The active ingredients, as well as the solvents of the present invention, have a unique utility over compositions having other salts in that this composition is compatible with the "catalytic converter" containing platinum and paladium compounds which has been mandatory in the United States for new cars since 1975. Thus, it is an appreciator for "no lead" fuel used in such cars.

COMPONENTS OF THE INVENTION

The Active Ingredients

Picric acid, also known as 2,4,6-trinitrophenol, is used in this invention as a strong oxidizing agent.

Ferrous sulfate is used for catalytic action in combination with the superior amount of picric acid noted above. The $Fe^{++}$ ion is readily oxidizing to ferric or reduced to $Fe°$. The compound is included since it represents a metal compound which can be oxidized and then retransformed into the lower oxidized state or first transformed to ferric and then retransformed to ferrous. The presence of the ferrous sulfate salt lends greater activity to the composition than would be expected when considering its minor percentile inclusion in the composition and thus may be viewed as a catalytic agent. Also, and quite importantly, iron sulfate has shown less corrosion on iron than such compounds as nickel sulfate, nickel nitrate, and cadmium sulfate in comparative testing. Additionally, the combination of picric acid and ferrous sulfate may be termed true synergistic mixture of other additives. In all cases, a catalytic action takes place due to the presence of a ferrous ion in the compound. The slightly heavier and less volatile ends are completely burned, thus increasing the energy and decreasing the emissions of raw hydrocarbons from the exhaust. Without the catalytic complete combustion of the fuel, the heavy ends condense on the comparatively cooler cylinder walls, eventually manifesting themselves as crankcase dilution elements, gum, sludge, etc. Therefore, the addition of the product to the fuel not only increases the energy output but also contributes to the more efficient and longer life of the lubricating oil at the same time giving a clean carbon and gum-free internal combustion engine.

Other Ingredients

Toluene. Of the alkyl benzenes possible, toluene, ortho-, meta-, and paraxylenes are preferred, and the mesitylenes are operable.

Alkanol. Of the lower alkanols, isopropanol is utilized in the MSX Mix as solvent of choice. Methyl and ethyl alcohols are operable but not as effective.

Nitrobenzene. This compound, as in the bulk formulations, is utilized as an additional solvent useful in the bulk formulations. It is miscible with alkanols and is a superior organic solvent for the picric acid.

Tertiary long chain amines. The action of the amine is as a particulate reducer and a preferred compound is Primene 81R which is tertiary dodecyl amine.

Water. As to the water additive, a purified water free of extraneous metal ions is preferred, although tap water is operable.

INTRODUCTION OF THE COMPOSITION INTO THE COMBUSTION CHAMBER OF BULK FUEL

The introduction of the composition into a diesel or gasoline bulk container is made in a facile manner by premeasurement and adding the composition based upon the number of gallons in the container. Such bulk addition may be made per U.S. gallon by utilizing a ratio of 1:1,000 to 1:2,000 dosage addition by volume with a preferred dosage of 1:1600.

For atomized use, a preferred modus is to introduce a mixture of alcohol and active ingredients into the motor utilizing a system such as the Harlo MotorKlean Fuel System (manufactured by Harlo Repower Ltd., Clearbrook, B.C., Canada) for direct injection into the line leading into the manifold. A preferred solvent utilized in the Harlo equipment or the injection is (by volume):

25%: Isopropyl alcohol
25%: Water
12.5%: Ethanol
12.5%: MSX Mix
25%: Methanol

The introduction of the MSX Mix into the combustion chamber when using the water-alcohol mixture in the "Harlo Device" further enhances the operation. This results from being able to actually control the amount of catalytic material being introduced. By a very carefully selected orifice, one milliliter of the atomized mixture is introduced for every mile traveled. In this way, at no time is a heavy concentration of the "fuel saver" or "energy extender" introduced into the combustion chamber to be wasted. By the very makeup of the compound and its volatility, it is introduced in the usable vapor phase.

As a result of utilization of the present composition, it has been found by tests that improvements in fuel economy between 12.5 and 15.5 percent urban and up to 27 percent highway conditions have been experienced. The variable range is due to make, condition, size of the vehicle, coupled with the variations in road conditions that drivers have at city versus highway driving, etc. It can be further stated that a mean average mileage improvement for all tests is about 20%. Based currently on the U.S. price per gallon of about 70 cents per gallon, this means that about 14 cents on every gallon of gasoline can be effected in savings.

The present invention also has use for domestic heating and light industrial oils (#2 and #3) used in furnaces and boilers. Here the same catalytic action of the ferrous ion takes place and more complete combustion is the result. Less carbon and residue is formed and the heat is not insulated from the transfer equipment. A greater calorific value (in BTU's) is released, giving more heat and energy for the same given amount of fuel. This, of course, results in less and more acceptable emissions from the chimney or stack.

In the case of bunker fuels (#6), these fuels are heavier and much more viscous compounds, often containing considerable amounts of organic or inorganic salts, which upon burning can diffuse and cause heavy melts or ash.

Stated otherwise, when used with residual fuels (#4, #5) where high temperature, slagging, or corrosion may be the main problem, the present additive may be used in order to serve as a combustion catalyst to further improve the burning properties of the fuel proper; i.e., to improve the $CO_2$ content of the flue gas and reduce the amount of the organic or carbonaceous material that would be left behind.

With respect to jet engines and jet fuels, which are lighter, and aviation-type fuels or with naphthas and special distillates for gas turbines, the additive combinations will reduce coke and varnish deposits in the engines and exhaust parts.

EXAMPLE 1

MSX Mix Formulation

Toluene and isopropyl alcohol were mixed together. The trinitrophenol (picric acid) was introduced to this mixture and stirred gently. It dissolved completely when left overnight. The nitrobenzene was added with a slight stir. The ferrous sulfate was dissolved in a small amount of hot water (a maximum of one-half gallon for one hundred gallon mix) and added to the mixture.

The product was allowed to stand overnight. It was inspected for any sediment settling, after Quality Control Tests were made and the product passed. It was released for ultimate packaging.

The water usually present with the trinitrophenol (picric acid) was taken into consideration in the formulation of this product.

EXAMPLE 2

Exhaust Emission Test with MSX Mix

In May 1977 at the testing site of Scott Environmental Technology, Inc., two series of tests were run according to the 1975 Cold Start Exhaust Emission Test with the objective to determine the effectiveness of the MSX fuel additive when mixed directly in bulk with in-tank gasoline in reducing exhaust emissions and improving fuel economy. The site of the test was Scott's Plumsteadville, Pa., facility, which is certified by the U.S. Environmental Protection Agency for conducting the federal exhaust emission test herein described.

Test Vehicle Description

Both emission tests were performed on a 1976 Chevrolet Impala sedan (vin: 1L57H5113039) equipped with a standard 350 cid, V-8 engine with 2-bbl. carburetor and automatic transmission. The vehicle was received in stock condition for the first emission test, with a pretest mileage of 23,605.7. The vehicle was equipped with the stock 1976 Chevrolet emission control equipment, including catalytic converter.

Basic Test Data

The additive (Natural Resources Guardianship International, Inc., West Orange, New Jersey) consisted of a gasoline fuel additive (MSX Mix) mixed directly in the gasoline fuel tank of the test vehicle. This mixture consisted of one part additive to 1600 parts gasoline with the following composition denoted 5/77:

Ferrous sulfate: 0.16 g
Picric acid (trinitrophenol): 2.8 g
Toluene: 2.7 kg
Isopropyl alcohol: 0.9 kg
Nitrobenzene: 0.13 g
Water: Balance For both tests, the baseline fuel used was Texaco's "lead-free" gasoline.

Test Procedure Description

The two 1975 cold start emission tests were performed in accordance with Federal Register Volume 41, Number 146. Deviations from this procedure included use of Natural Resources Guardianship International's in-tank fuel supply for both the baseline and device tests, and the calculation of carbon dioxide mass emissions for use in determining fuel economy.

The test vehicle was delivered to Scott's Plumsteadville, Pa., facility by 1600 hours on May 3, 1977, with the initial "cold soak" beginning by 1700 hours. The following morning the dynamometer was warmed up with a non-test vehicle and the load set at 14.7 RHP at 50 miles per hour (the vehicle was equipped with factory air conditioning). The dynamometer inertia was fixed at 5,000 pounds. The baseline emission test (stock condition, no device) was begun at 1032 hours and completed by 1112 hours.

Following the baseline test, several additional emission tests were performed on the test vehicle including one 1975 Federal Cold Start Test (Scott Reports SET 1620-01-0577 and SET 1620-02-0577) and several 1972 "Hot-Start" emission tests (Scott Report SET 1620-03-0577).

On May 16 and 17, 1977, Scott personnel blended intank fuel (1 part MSX Mix additive to 1600 parts Texaco lead-free gasoline) then accumulated 500.7 miles on the vehicle. (Mileage start: 25871.8; mileage end: 26372.5). The "cold soak" period began at 1715 on May 17, 1977, and was terminated at the beginning of the 1975 "Cold-Start" Test No. 3 at 0927 hours on May 18.

The basic equation used to calculate the fuel economy of a vehicle, in miles per gallon, from the mass emission data gathered during a 1975 Federal Emission Test is as follows:

$$\text{mpg} = \frac{\text{grams of carbon/gallon of fuel}}{\text{grams of carbon in exhaust/mile}}$$

SUMMARY OF RESULTS

The data presented in Table 1 below summarizes the vehicle exhaust emission and fuel economy tests performed. The exhaust emissions are presented in grams per mile for total hydrocarbons, carbon monoxide and oxides of nitrogen. Fuel economy measurements are shown in miles per gallon. Also included are the applicable 1976 Federal Exhaust Emission Standards for light duty vehicles.

In comparing the two sets of test results, use of the MSX Mix additive mixed with the in-tank fuel reduced carbon monoxide and hydrocarbons while increasing oxides of nitrogen emissions. In addition, fuel economy improved from 8.72 MPG to 10.65 MPG.

TABLE 1

| Data Summary - 1975 Federal Exhaust Emission Tests | | | | | |
|---|---|---|---|---|---|
| Test Date | Test Description | CO g/mi. | THC g/mi. | $NO_x$ g/mi. | Fuel Economy (miles per gallon) |
| May 4, 1977 | Baseline - Stock Condition | 16.6 | 0.60 | 1.69 | 8.72 |
| May 18, 1977 | MSX Mix Additive - In-Tank Blending | 9.4 | 0.46 | 2.32 | 10.65 |
| | (Federal Standards 1976 LDV) | 15.0 | 1.50 | 3.10 | — |

EXAMPLE 3

In the same manner as the procedure utilized in Example 2, another series of tests utilized the MSX additive designated 7/77. This additive had the composition per U.S. gallon as follows:

Ferrous sulfate: 1.36 grams

Picric acid: 45.36 grams
Toluene: 2.38 kg
Isopropyl alcohol: 1.02 kg
Nitrobenzene: 2.72 grams
Long chain amine; e.g., tertiary dodecylamine: 1.66 grams
Water: Balance and the following results were obtained as shown in Table 2.

TABLE 2
TESTS USING ADDITIVE OF 7/77
Data Summary - 1975 Federal Exhaust Emission and Fuel Economy Tests
(Performed by Scott Environmental Technology, Inc.)

|   |   | CO g/mi. | THC g/mi. | $NO_x$ g/mi. | Fuel Economy miles per gallon Urban | Fuel Economy miles per gallon Highway |
|---|---|---|---|---|---|---|
| 1976 Chevrolet Caprice | Baseline - stock condition without Additive | 4.1 | .61 | 3.18 | 9.85 | 18.26 |
| 1976 Chevrolet Caprice | With 7/77 Additive | 2.3 | .49 | 3.79 | 12.55 | 27.73 |
| 1976 Chevrolet Caprice | % increase or (decrease) | (44) | (20) | 19 | 27 | 52 |
| 1975 Pontiac Astre | Baseline - stock condition without Additive | 40.4 | 2.62 | 1.23 | 15.45 | not completed |
| 1975 Pontiac Astre | With 7/77 Additive | 27.1 | 2.30 | 1.40 | 19.62 | not completed |
| 1975 Pontiac Astre | % increase or (decrease) | (33) | (12) | 14 | 27 | not completed |
|   | Federal Standards 1976 LDV | 15.0 | 1.50 | 3.10 | — | — |

EXAMPLE 4

An ASTM D-13-56 Copper Strip and Stainless Steel Corrosion Test was effected using the 7/77 additive formulation (see Example 3) comparing various inorganic metal salts with ferrous sulfate. This test was made for 3 hours at 212° F.

| Salt | ASTM D-13-56 Results |
|---|---|
| Ferrous sulfate | No. 1 (Pass) (No change) |
| Nickel sulfate | No. 2 (Dark tarnish, multicolored, peacock) |
| Nickel nitrate | No. 3 (Magenta, light gray) |
| Cadmium sulfate | No. 3 (Magenta, brown) |

A vapor phase corrosion test was made where vapors were utilized for 30 minutes at 300° to 500° F. In this case the iron salt showed slight discoloration whereas the other metal salts blackened with slight pitting. Both stainless steel and copper strips were used in this test.

I claim:

1. A fuel additive for internal combustion and diesel engines consisting of an active ingredient formulation comprising a mixture of picric acid and ferrous sulfate in a relationship of picric acid:ferrous sulfate of about 2:1 to about 550:1 in a mixed solvent of lower alcohol, toluene, and water.

2. The additive according to claim 1 wherein the additive is in atomized form for introduction into the engine.

3. The additive according to claim 1 which additionally contains a minor amount of nitrobenzene as a solvent.

4. The additive according to claim 1 which additionally contains a minor amount of tertiary dodecylamine as a particulate reducer.

5. An additive for direct bulk addition to gasoline and diesel fuel containers which comprises in one U.S. gallon:

Ferrous sulfate: 0.08–1.4 g
Picric acid: 2.8–45.0 g
Toluene: 2.4–1.0 kg
Isopropyl alcohol: 1.0–2.4 kg
Nitrobenzene: 0.08–2.7 g
Tertiary dodecylamine: 0.2–1.7 g
Water: Balance.

6. The additive according to claim 5 wherein the preferred amount in one U.S. gallon is:

Ferrous sulfate: 1.4 g
Picric acid: 45.0 g
Toluene: 2.4 kg
Isopropyl alcohol: 1.0 kg
Nitrobenzene: 2.7 g
Tertiary dodecylamine: 1.7 g
Water: Balance.

7. The additive according to claim 1 wherein the dosage utilized for addition to fuel is 1:1,000 to 1:2,000 additive to fuel.

8. The additive according to claim 1 wherein the dosage utilized for addition to fuel is about 1:1600 additive to fuel.

9. A method for treating fuels for gasoline and diesel engines which comprises adding thereto to each U.S. gallon an additive/fuel comprising a mixture of picric acid and ferrous sulfate in a relationship of picric acid:ferrous sulfate of about 2:1 to about 550:1 in a mixed solvent of lower alkanol, toluene, and water in a dosage of about 1:1,000 to 1:2,000 additive to fuel.

10. The method according to claim 9 wherein the dosage is about 1:1600 additive to fuel.

11. The method according to claim 9 wherein the additive is in atomized form for introduction into the engine.

12. The method according to claim 9 wherein the additive additionally contains a minor amount of nitrobenzene as a solvent.

13. The method according to claim 9 wherein the additive additionally contains a minor amount of tertiary dodecylamine as a solvent.

14. An additive for use in bunker and residual fuels which has the following ingredients per U.S. gallon:

Ferrous sulfate: 4–5.6 g
Picric Acid: 8–12 g
Toluene: 4–5.6 kg
Isopropanol: 0.8–1.2 kg
Tertiary dodecylamine: 0.2–1.7 g
Water: Balance.

15. The additive according to claim 14 wherein the ingredients have preferred values per U.S. gallon as follows:
Ferrous sulfate: 4 g
Picric Acid: 8 g
Toluene: 4 kg
Isopropanol: 0.8 kg
Tertiary dodecylamine: 0.2 g
Water: Balance.

16. The additive according to claim 14 wherein the dosage is in the ratio of 1:1,000 to 1:2,000 additive to fuel.

17. The additive according to claim 14 wherein the dosage is in the ratio of about 1:1600 additive to fuel.

* * * * *